US005367427A

United States Patent [19]
Matsko et al.

[11] Patent Number: 5,367,427
[45] Date of Patent: Nov. 22, 1994

[54] OVERCURRENT TRIP UNIT WITH INDICATION OF DEPENDENCY OF TRIP FUNCTIONS

[75] Inventors: Joseph J. Matsko, Beaver; Gary F. Saletta, Penn Township, Westmoreland County, both of Pa.

[73] Assignee: Eaton Corporation, Cleveland, Ohio

[21] Appl. No.: 92,294

[22] Filed: Jul. 15, 1993

[51] Int. Cl.$^5$ .............................................. H02H 3/04
[52] U.S. Cl. ....................................... 361/94; 361/96; 361/97
[58] Field of Search ................................ 361/94–97; 364/481; 345/116, 133, 150

[56] References Cited
U.S. PATENT DOCUMENTS
4,752,853  6/1988  Matsko et al. ................ 361/94

Primary Examiner—A. D. Pellinen
Assistant Examiner—Sally C. Medley
Attorney, Agent, or Firm—Martin J. Moran

[57] ABSTRACT

A graphical representation of the current/time trip characteristic displayed on the operator's panel of an electronic trip unit for a circuit interrupter, has different indicia, such as different colors, identifying the representation of independent trip functions from those of dependent trip functions, thereby making the operator aware that adjustment of one of the dependent trip functions will also affect an adjustment of the other dependent portions of the current/time trip characteristic.

5 Claims, 3 Drawing Sheets

OVERCURRENT TRIP UNIT WITH INDICATION OF DEPENDENCY OF TRIP FUNCTIONS

BACKGROUND OF THE INVENTION

1. Field of the Invention

This invention relates to overcurrent trip units for electric circuit interrupting devices, and more particularly to trip units which provide multiple protection functions having a dependency relationship between selectable trip parameters, and which have a graphical representation of the current/time trip characteristic of the device displayed on an operator's panel.

2. Background Information

Circuit interrupters for industrial and commercial applications commonly provide multiple protection functions. For instance, such circuit interrupters typically provide instantaneous and long delay protection and may also provide short delay protection and/or ground fault protection. The instantaneous trip function protects the electrical conductors to which the current interrupting device is connected from damaging overcurrent conditions, such as short circuits. The long delay trip function protects the load served by the protected electrical system from overcurrents. The short delay trip function can be used to coordinate tripping of down stream circuit interrupters in a hierarchy of circuit interrupters. As implied, the ground fault trip function protects the electrical system from faults to ground.

Each circuit interrupter is designed for a specific maximum continuous current. This current rating may be set by selection of a resistor which converts the current to a voltage for use by the trip unit. In some cases, a single circuit interrupter frame may be easily adapted for installations which call for a range of maximum continuous currents, up to the design limits of the frame, through use of a removable rating plug by which the current rating of the device can be established.

Traditionally, the pick-up currents for the various protection functions have been selectable multiples or fractions of this current rating. Thus, instantaneous protection trips the device anytime the current reaches a selected multiple of the rated current, such as for example, ten times the rated current. Pick-up for short delay protection is a lesser multiple of the rated current, while pick-up current for long delay protection may be a fraction of the rated current.

The long delay and short delay trip functions require that the overcurrent condition exist for a period of time. Typically, the long delay trip function has been selected such that a trip signal is generated if the current exceeds six times the rated current for the selected long delay interval. As damage can also occur at lesser current levels for longer periods of time, an inverse time function is used for long delay protection. Thus, the smaller the current the longer the time to trip, and the larger the current, the shorter the time to trip. Typically, an $I^2t$ characteristic has been used for long delay protection, although in some circuit breakers the inverse time function is programmable, and may include other functions such as $It$ or $I^4t$. Such a circuit breaker with a programmable inverse time trip function is disclosed in commonly owned U.S. patent application Ser. No. 07/907,131 filed on Jun. 30, 1992. Typically, the short delay trip is only generated when the short delay pick-up current is exceeded for the short delay interval, although in some applications an inverse time function is used for short delay protection also.

If the current/time characteristic of a circuit interrupter is plotted on a logarithmic scale with current on the abscissa and time on the ordinate, the pick-up currents appear as vertical line segments, and the $I^2t$ characteristic of the long delay, and if used for the short delay, appear as straight diagonal lines. The assignee of this application manufacturers circuit breakers in which a graphic representation of this response characteristic is provided on the operator's panel together with switches for setting the parameters of the protection functions located adjacent the appropriate section of the current/time characteristic. Such a circuit breaker is disclosed in U.S. Pat. No. 4,752,853.

With the traditional approach of having the instantaneous, short delay and long delay pick-up currents selectable as factors of the rated current, the protection functions are independent of one another, so that setting the parameters for one function does not affect the setting of parameters for another function. However, it has been found desirable in some applications to adjust the short delay trip function in coordination with the long delay trip function. Thus, trip units have been designed in which the short delay pick-up current is changed to a multiple of the long delay pick-up current, and not the rated current. This results in dependence of the short delay protection upon the long delay pick-up level.

There is a need to communicate this dependence of the short delay upon the long delay pick-up level and the adjustment of the inverse time function of the circuit interrupting device to the user.

SUMMARY OF THE INVENTION

This need and others are satisfied by the invention which is directed to an overcurrent trip unit for an electric current interrupting device which has means establishing a current rating for the current interrupting device, such as, for example, a rating plug, means sensing current in the device, means responsive to the sensed current for generating a trip signal in accordance with a current/time characteristic having a first portion which is an independent function of the current rating, and a second portion having a plurality of sections which are interdependent functions of the current rating. The trip unit of the invention further has an operator's panel having a graphical representation of the current/time characteristic with a first indicia indicating the first portion of the current/time characteristic and a second indicia indicating the second portion of the current/time characteristic. The different indicia for the two portions of the graphic representation of the current/time characteristic, which are preferably different colors, make the operator aware that adjustment of a parameter affecting a trip function represented by the interdependent portion of the current/time characteristic will affect another parameter.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
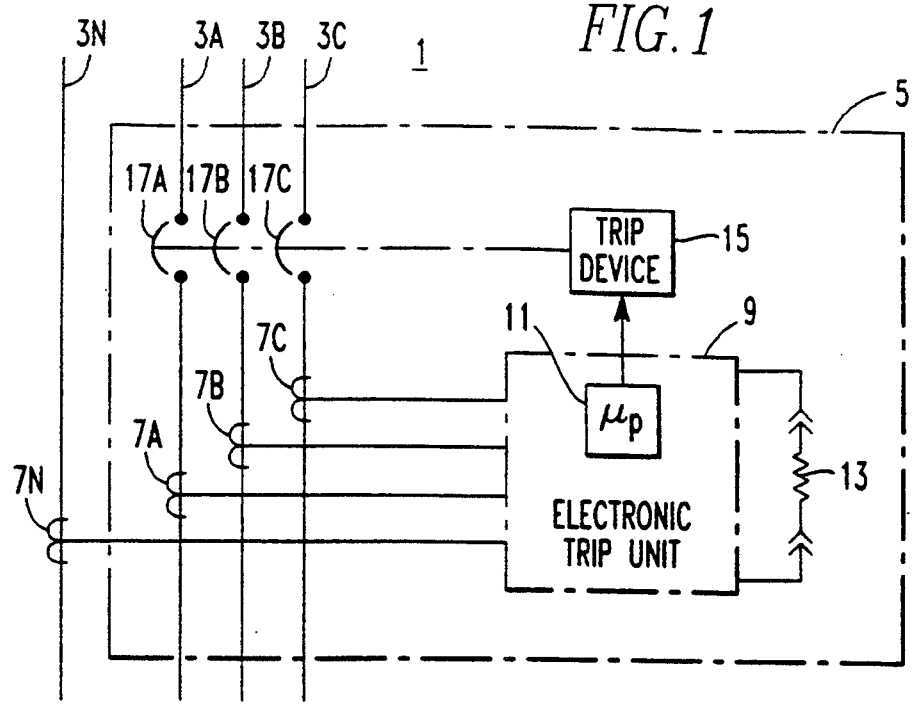
FIG. 1 is a schematic diagram in block form of a circuit interrupter in accordance with the invention shown connected to an electrical system.

The circuit interrupting device in accordance with the preferred embodiment of the invention is the circuit breaker shown in FIG. 1 connected for protection of an electrical system 1 which includes three phase conductors 3a, 3b and 3c, and which may also include a neutral conductor 3n. The circuit interrupter in the preferred embodiment of the invention is a microprocessor based circuit breaker 5. The circuit breaker 5 has current transformers 7a, 7b, 7c, and 7n which generate signals representative of the currents flowing in the respective phase conductors, and in the neutral conductor if desired. An electronic trip unit 9 monitors the currents sensed by the current transformers and generates a trip signal in response to predetermined current/time conditions. The electronic trip unit 9 incorporates a microprocessor 11. The microprocessor based electronic trip unit 11 may be of the type disclosed in U.S. Pat. No. 4,752,853 which is hereby incorporated by reference. The electronic trip unit 9 has a removable rating plug 13. The rating plug 13 incorporates a resistor which can be selected to set the maximum continuous current that will be permitted by the circuit breaker 5 as previously discussed.

The electronic trip unit 9 generates a trip signal in response to the specified overcurrent conditions. This trip signal actuates a trip device 15 which opens sets of separable contacts 17a, 17b and 17c, to interrupt current through the phase conductors of the electrical system 1.

The circuit breaker 5 provides several modes of protection of the types previously discussed. In particular, long delay and instantaneous protection are provided. Short delay and ground fault protection can also be provided. These various protection functions can be more fully understood by reference to FIG. 2 which illustrates the current/time characteristic 19 of the electronic trip unit 9. This is a log-log plot with current shown on the abscissa and time on the ordinate.

Figure 2:
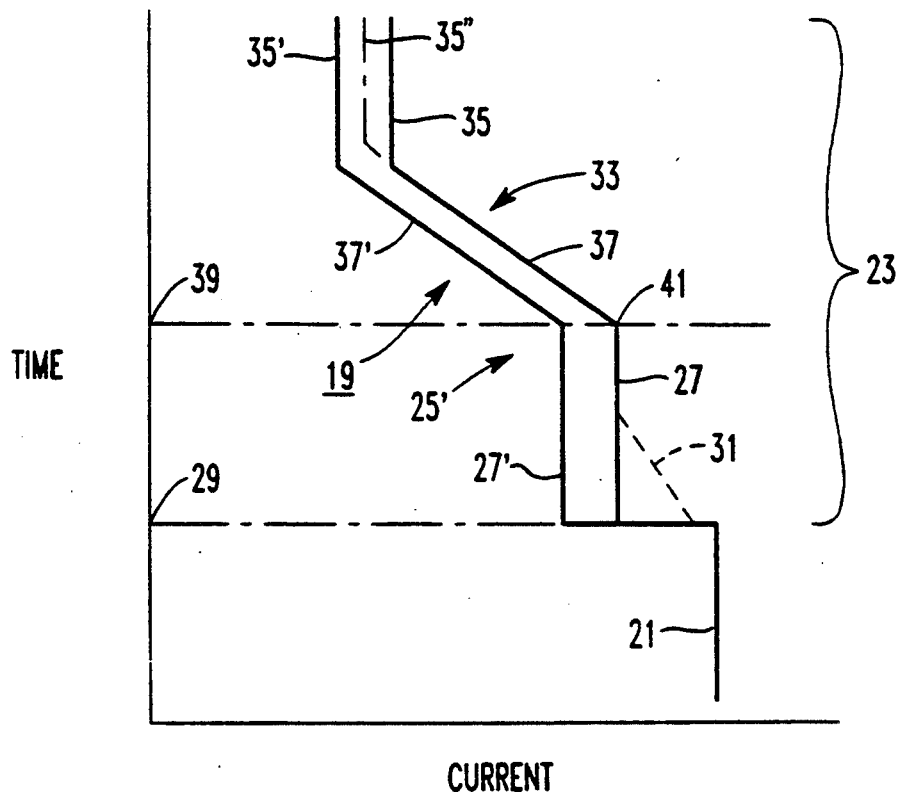
FIG. 2 is a logarithmic plot of the current/time characteristic of the circuit breaker of the invention.

The instantaneous protection function is represented in FIG. 2 by the portion 21 of the current/time characteristic 19. The instantaneous trip function protects the circuit breaker from large overcurrents such as short circuits. If the current exceeds the pick-up current for the instantaneous trip function, the circuit breaker trips immediately.

The second portion 23 of the current/time characteristic 19 above the instantaneous portion 21 provides the time delayed trip functions. A first section 25 of this upper portion of the current/time characteristic provides the short delay trip function. The vertical line segment 27 is the short delay pick-up current. As can be seen from FIG. 2, a current which exceeds the short delay pick-up current 27 must persist for a period of time determined by the short delay pick-up time 29 before the circuit breaker will trip. In some applications an inverse time function is used for the short delay trip. This inverse time function for short delay protection is indicated by the dashed line 31. With such an inverse time function for the short delay it can be seen from FIG. 2 that a current above the short delay pick-up value 27 would have to persist for a longer period of time before the circuit breaker trips, but that at higher current levels the circuit breaker would trip sooner.

A second section 33 of the upper portion 25 of the current/time characteristic 19 provides the long delay protection. The long delay pick-up current is represented by the vertical line segment 35. Commonly, the long delay trip function is provided with an inverse time function represented by the diagonal line segment 37. Typically $I^2t$ inverse time functions are used for the long delay and if used, the short delay trip functions. However, other inverse time functions such as It or $I^4t$ may be used. These other inverse time functions would provide a different slope to the diagonal line segments 31 and 37.

The instantaneous pick-up current 21, short delay pick-up current 27, and long delay pick-up current 35 are selectable. The instantaneous pick-up current 21 is a selected multiple of the circuit breaker rated current, $I_n$, which as discussed above is set by the rating plug 13. The long delay pick-up current, $I_r$, shown at 35 is a selectable fraction of the rated current, $I_n$. The short delay pick-up current 27 is a selectable multiple of the long delay pick-up current $I_r$ shown at 35. The long delay time 39 establishes the point 41 on the current/time characteristic 19. The current at point 41, which must persist for the long delay time 39 in order to generate the long delay trip is six times the long delay pick-up current 35 in the exemplary circuit breaker.

As the short delay pick-up current 27 is a multiple of the long delay pick-up current 35, a change in the value of the long delay pick-up current automatically effects a change in the short delay pick-up current. Thus as shown in FIG. 2, a reduction in the long delay pick-up current to the current 35', shifts the short delay pick-up current to the current 27'. In addition, since the long delay trip is generated in response to a current equal to six times the long delay pick-up current $I_r$ which has shifted to 35', the inverse time function shifts to the position 37'. A similar shift would occur in the short delay inverse time function if utilized. Thus, it can be seen that a change in the long delay pick-up current results in a shift of the entire upper portion 25' of the current/time function 19. As the instantaneous trip function is a function of the rated current $I_n$, it is not affected by the change in long delay pick-up current. It is clear from the above, that the instantaneous trip function is independent of the long delay pick-up function.

For purposes of illustration, in other types of circuit breakers, the short delay pick-up current 27 is a function of the rated current $I_n$ rather than the long delay pick-up current 35. Also, in those circuit breakers, the long delay is set to trip upon the expiration of the long delay time interval at a current equal to six times the rated current, again $I_n$, rather than the long delay pick-up current $I_r$.

Hence, a change in the long delay pick-up current in those circuit breakers to, for instance the current 35" as shown in FIG. 2 by the chain line, does not affect either the short delay trip function 25 or the long delay inverse time function 37. It does, however, result in an extension, or shortening, of the inverse time function 37, as represented by the intersection of the line segment 37 and the line segment 35" in FIG. 2.

An important feature of the present invention is the operator interface. The purpose of this interface is to communicate to the operator as clearly as possible the capabilities of the circuit breaker 5, and the operating status of the circuit breaker, and to provide easily understood and operated means for setting the various trip functions of the circuit breaker.

Figure 3:
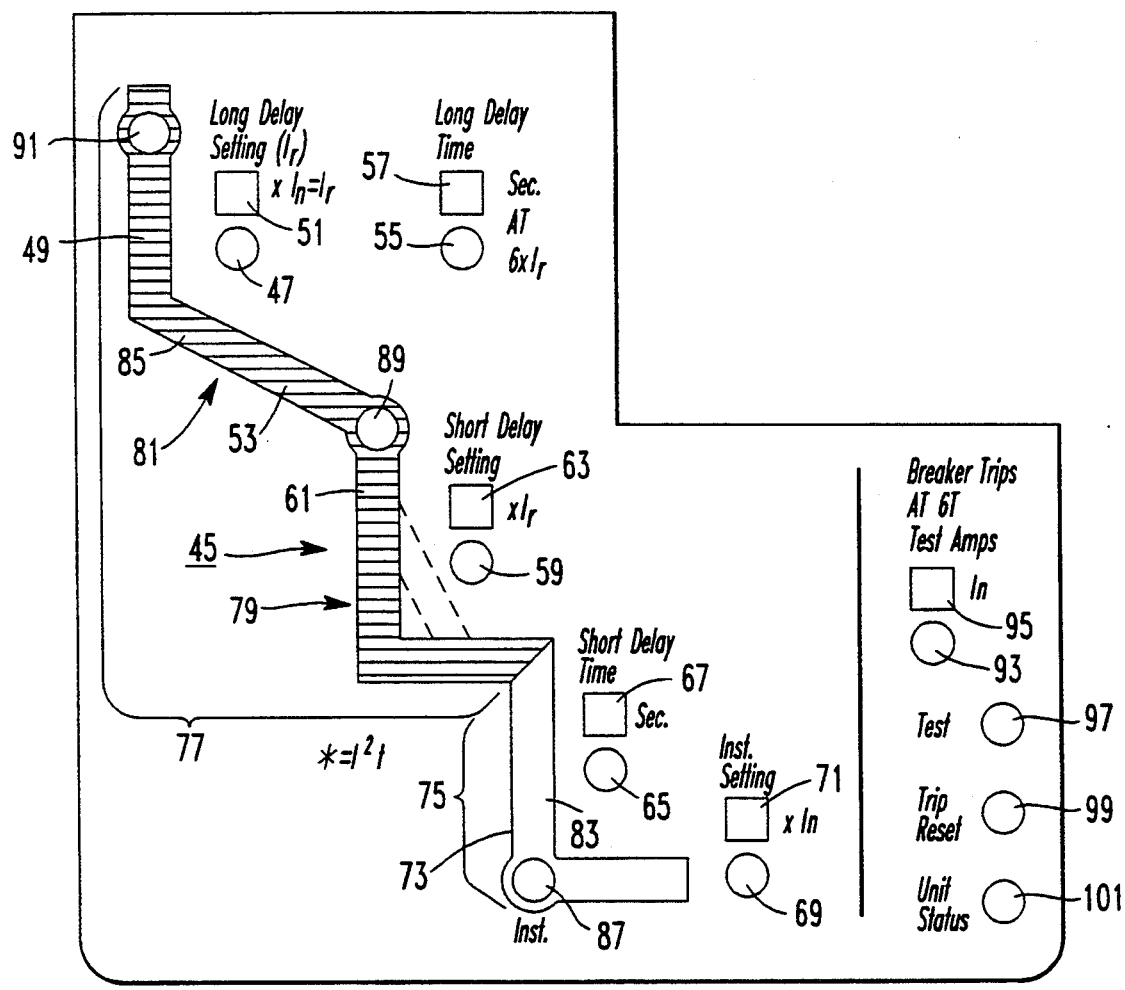
FIG. 3 is an illustration of the operator's panel of the circuit breaker of FIG. 1 in accordance with a first embodiment of the invention.

The operator interface for the circuit breaker 5 includes an operator panel mounted on the trip unit 9. FIG. 3 illustrates the relevant portion of the operator's panel 43. A prominent feature of this operator panel is a graphical representation 45 of the current/time characteristic 19 illustrated in FIG. 2. A number of rotary switches are mounted on the operator's panel 43 for setting the parameters for the various trip functions of the circuit breaker. These switches are placed on the panel 43 adjacent the pertinent portion of the representation 45 of the current/time characteristic. Thus, a switch 47 adjacent the long delay pick-up current section 49 of the characteristic 43 provides for selection of the long delay pick-up current. The long delay pick-up current is selected as a function of the rated current $I_n$. The fraction selected by the switch 47 is visually presented in a display window 51 adjacent to switch 47. The legend "X $I_n = I_r$" appears next to the window 51 to inform the operator that the long delay pick-up current setting $I_r$ is a function of $I_n$. Adjacent to section 81 on the characteristic 43 indicating the long delay time setting, is a switch 55 for selecting the long delay time interval, and a window 57 for displaying the selected time setting. A legend adjacent the switch 55 and window 57 indicates that this is the long delay time setting and that the long delay trip will occur at the selected time at six times the long delay pick-up setting $I_r$.

Another rotary switch 59 adjacent the short delay pick-up current 61 of the characteristic 45 is for selection of the short delay setting which is displayed in the window 63. An adjacent legend reminds the operator that the short delay setting is the factor displayed in the window 63 multiplied by $I_r$, the long delay setting. The short delay time is set by the switch 65 and displayed in the window 67. The pick-up current for the instantaneous trip is set by the switch 69, and the factor by which the rated current is multiplied to set the instantaneous trip is displayed in the window 71. Both of which are adjacent the instantaneous trip current portion 73 of the characteristic 45.

As explained in connection with FIG. 2, the lower portion 75 of the current/time characteristic 45 on the operator's panel as shown in FIG. 3 represents the instantaneous trip function which is independent of the other trip functions. The upper portion 77 of the representation 45 of the current/trip characteristic includes a section 79 displaying the short delay trip function and a section 81 displaying the long delay trip function. In order to emphasize to the operator that the short delay function is dependent upon the long delay pick-up level while the instantaneous function is independent, a first indicia 83 is used for the lower portion 75 of the characteristic 45 while a second indicia 85 is used for the upper portion 77. In the preferred embodiment of the invention different colors are used as the indicia 83 and 85. In the exemplary circuit breaker 5, the color white is used as the indicia 83, and the color blue is used as the indicia 85. Clearly, other colors could be used to identify the independent and interdependent portions of the representation 45 of the current/time characteristic, or even other forms of indicia could be used for this purpose.

The operator's panel also includes light emitting diodes (LEDs) which are used to inform the operator of the operating state of the circuit breaker 5. The LED 87, which is embedded in the representation 45 of the current/time characteristic at the location of the instantaneous pick-up current value 73, is illuminated in response to an instantaneous trip. The LED 89 adjacent the short delay pick-up current portion 61 of the representation 45 is illuminated continuously in response to a short delay trip. LED 91 flashes when the long delay pick-up current is exceeded and comes on steady following a long delay trip. The operator's panel 43 of the circuit breaker 5 also includes a switch 93 for setting a test pick-up current for the trip unit. This test current is set as a factor of the rated current $I_n$ which is displayed in the window 95. The test is initiated by pressing a test button 97. The circuit breaker is reset following a trip by pressing a trip reset button 99. An LED 101 blinks continuously when the circuit breaker is operating normally to provide an indication of the operating status of the breaker.

Figure 4:
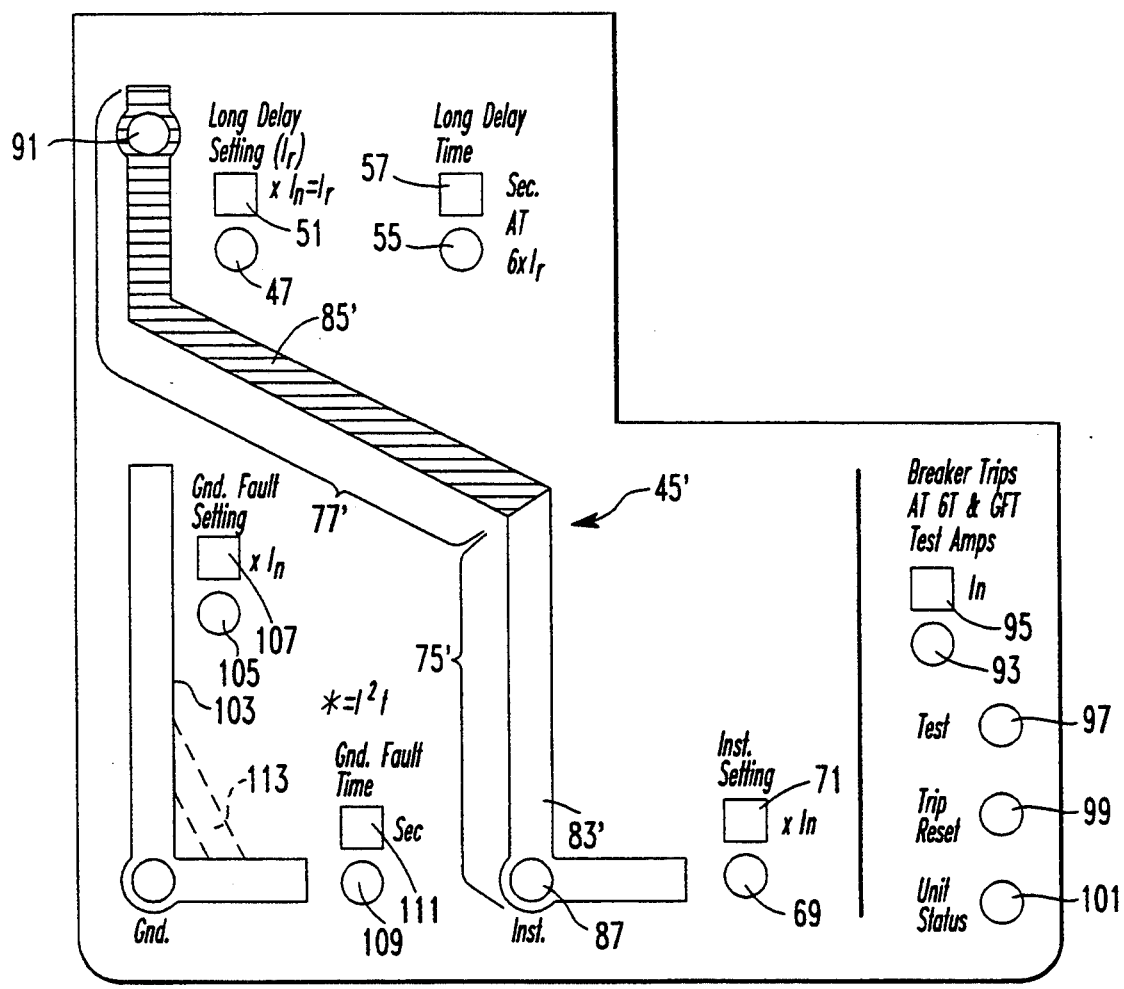
FIG. 4 is an illustration of the operator's panel of the circuit breaker of FIG. 1 in accordance with another embodiment of the invention.

Various combinations of protection functions can be provided by the circuit breaker 5. FIG. 4 illustrates the operator's panel 43' for another embodiment of the invention in which long delay and instantaneous protection are provided, but not short delay protection, and in which ground fault protection is provided. Elements of the modified operator's panel 43' which are the same as those in the operator's panel 43 shown in FIG. 2 are identified with like reference characters. Elements which are similar to elements of the panel 43 are identified by primed reference characters. As can be seen from FIG. 4, the representation 45' of the current/time characteristic does not include the short delay function, but the upper portion representing the long delay function is marked with the indicia 85' to indicate that the inverse time function is shifted with a change in the long delay pick-up setting.

The operator's panel 43' includes a graphical representation 103 of the ground fault trip function. The ground fault trip current is a fraction of the rated current $I_n$, which is set by the switch 105 and is displayed in the window 107. The time for the ground fault trip is set by the switch 109, and displayed in the window 111. The ground fault trip function may be an instantaneous trip as indicated by the graphical representation 103 or an inverse time function as represented by the indicia 113 shown in dashed line.

Circuit breakers in accordance with the invention may use various combinations of the trip functions illustrated in the embodiments shown in FIGS. 3 and 4. For instance, a circuit breaker could incorporate all of the trip functions: long delay, short delay, instantaneous and ground fault.

While specific embodiments of the invention have been described in detail, it will be appreciated by those skilled in the art that various modifications, and alternatives to those details could be developed in light of the overall teachings of the disclosure. By way of example only, an array of membrane switches may be used in place of the rotary switches illustrated for setting the various parameters on the operator's panel as described in commonly owned U.S. patent application Ser. No. 07/969,731, filed on Oct. 27, 1992. Accordingly, the particular arrangements disclosed are meant to be illustrative only and not limiting as to the scope of invention which is to be given the full breadth of the claims appended claims and any and all equivalents thereof.

What is claimed is:

1. An overcurrent trip unit for an electric current interrupting device comprising:
    means establishing a current rating for said current interrupting device;
    current sensing means sensing current in said electric current interrupting device;
    means responsive to said current sensing means generating a trip signal in accordance with a current-/time characteristic having a first portion and a second portion, said first portion being a function of said current rating which is independent of said current/time characteristic, and said second portion having a plurality of sections at least some of which are functions of said current rating which are dependent upon one another;
    an operator panel; and
    a graphic representation on said operator panel of said current/time characteristic with a first indicia indicating said first portion of said current/time characteristic, and a second indicia indicating said second portion of said current/time characteristic.

2. The overcurrent trip unit of claim 1 wherein said first indicia indicating said first portion of said current-/time characteristic on said graphic representation is a first color, and wherein said second indicia indicating said second portion of said current/time characteristic on said graphic representation is a second color.

3. The overcurrent trip unit of claim 1 wherein said second portion of said graphic representation of said current/time characteristic includes a long delay protection characteristic having a section for a long delay pick-up current which is a selectable fraction of said current rating, and a section which is a function of said long delay pick-up current and a selectable long delay time.

4. The overcurrent trip unit of claim 3 wherein said second portion of said graphic representation of said current/time characteristic further includes a short delay protection characteristic section having a pick-up current which is a selectable multiple of said long delay pick,up current and a short delay time.

5. The overcurrent trip unit of claim 4 wherein said first indicia indicating said first portion of said current-/time characteristic on said graphic representation is a first color, and wherein said second indicia indicating said second portion of said current/time characteristic on said graphic representation is a second color.

* * * * *

UNITED STATES PATENT AND TRADEMARK OFFICE
CERTIFICATE OF CORRECTION

PATENT NO. : 5,367,427

DATED : November 22, 1994

INVENTOR(S) : Joseph J. Matsko and Gary F. Saletta

It is certified that error appears in the above-identified patent and that said Letters Patent is hereby corrected as shown below:

Column 7, line 11, the line should begin with the words "SECOND PORTION OF SAID".

Signed and Sealed this

Fourth Day of April, 1995

Attest:

BRUCE LEHMAN

*Attesting Officer*   *Commissioner of Patents and Trademarks*